TELEVISION RECEIVER

Filed April 15, 1953

2 Sheets-Sheet 1

INVENTOR.
Marlin G. Kroger
BY Foorman L. Mueller
Atty.

July 22, 1958 M. G. KROGER 2,844,649

TELEVISION RECEIVER

Filed April 15, 1953 2 Sheets-Sheet 2

INVENTOR.
Marlin G. Kroger
BY
Norman L. Mueller
Atty.

United States Patent Office 2,844,649

Patented July 22, 1958

2,844,649

TELEVISION RECEIVER

Marlin G. Kroger, Oak Park, Ill., assignor to Motorola, Inc., Chicago, Ill., a corporation of Illinois Application April 15, 1953, Serial No. 349,014

5 Claims. (Cl. 178—7.3)

Figure 1:
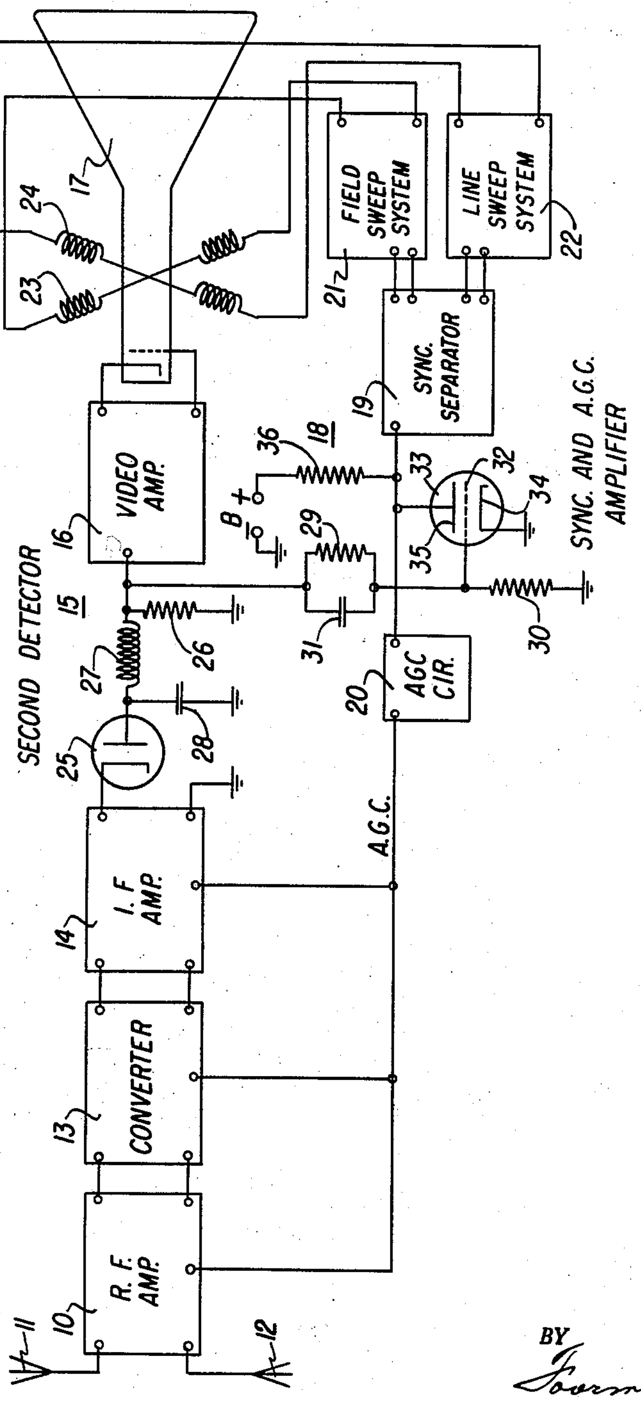

The present invention relates generally to synchronization and gain control in television receivers. More particularly, the invention is directed to an improved television receiver for utilizing a standard television signal, which receiver incorporates an amplifier for amplifying the composite video signal derived by demodulating the received television signal prior to the application of such composite video signal to the synchronizing signal separator and automatic gain control (AGC) circuit of the receiver.

It is usual in many present-day commercial television receivers to provide an amplifier, such as that mentioned above, to improve the synchronization process and automatic gain control of the receiver. It is preferable that a direct-current coupling network be utilized between the amplifier and the detector of the receiver since the amplifier must amplify and translate the low frequency synchronizing components of the composite video signal which are utilized for synchronizing and AGC purposes.

The direct-current coupling of the aforementioned amplifier to the second detector of the receiver creates certain problems in that the bias on the amplifier has a tendency to vary as the average value of the composite video signal varies in accordance with changes in picture content even though the intensity of the received television signal itself remains constant. That is, during intervals when a predominantly black picture is received, the bias of the amplifier tends to increase in a negative direction which tends to cause the amplifier to de-emphasize the synchronizing components or clip the peaks of such components thereby impairing the synchronizing process.

The above condition on black pictures can be obviated when a self-biasing network is incorporated into the input circuit of the aforementioned amplifier. With such a self-biasing network, the amplifier operates efficiently during the intervals when the picture content of the composite video signal is substantially black. However, during intervals when the picture content is white, the self-biasing network increases the negative bias of the amplifier so that there is an impairment of the synchronization process during the intervals of white pictures. The amplifier is still, therefore, dependent upon picture content of the composite video signal for its operating bias.

It is an object of the present invention to provide an improved television receiver incorporating an amplifier for the aforedescribed purpose and in which the aforementioned disadvantages inherent in such amplifiers are corrected by means of an extremely simple network.

A further object of the invention is to provide a new and improved television receiver which incorporates an amplifier for the aforementioned purpose which amplifier is so constructed that its operating bias is substantially unaffected by changes in picture content of the composite video signal.

A feature of the invention is the provision of an improved television receiver that includes an amplifier for the aforementioned purpose, and in which a self-biasing network is included in the direct-current coupling network between the amplifier and the second detector of the receiver to provide a resultant network that renders the bias of the amplifier substantially independent of variations in picture content in the composite video signal.

A more specific feature of the invention is the provision of such an improved television receiver including the aforementioned amplifier, in which the amplifier is directly coupled to the second detector of the receiver in such a manner that its bias is established at a certain level which has a tendency to vary in one sense for variations in picture content of the applied composite video signal, and in which the input circuit of the amplifier includes a self-biasing network which establishes the bias of the amplifier at a resultant level having a tendency to vary in the opposite sense in response to the aforementioned variations in picture content so that the resultant bias on the amplifier is substantially independent of such picture content variations.

The above and other features of the invention which are believed to be new are set forth with particularity in the appended claims. The invention itself, however, together with further objects and advantages thereof, may best be understood by reference to the following description when taken in conjunction with the accompanying drawings in which:

Figure 1 illustrates a television receiver constructed in accordance with the invention; and Figures 2A, 2B, 3A, 3B are curves useful in explaining the operation of the invention.

The television receiver of the present invention is intended to utilize a composite television signal including video components and also including synchronizing components having an amplitude exceeding that of the video components. The receiver comprises a detector for demodulating the received television signal to develop a composite video signal including the aforementioned video and synchronizing components and having an average value that varies in accordance with changes in picture content. An amplifier for the composite video signal is included in the receiver; and a network is provided for directly coupling the amplifier to the detector, the network being constructed so that a certain bias is established on the amplifier. This bias has a tendency to vary in response to variations in the picture content in the aforementioned composite video signal. Finally, a self-biasing network for the amplifier is included in the coupling network to establish a resultant bias on the amplifier which tends to vary in the opposite sense to the tendency of the aforementioned bias in response to such variations in the aforementioned picture content. The resultant bias on the amplifier is, therefore, substantially independent of changes in picture content in the aforementioned composite video signal.

The television receiver illustrated in Figure 1 includes a radio frequency amplifier 10 of any desired number of stages, and which has input terminals connected to an appropriate antenna circuit 11, 12 and output terminals connected through a converter 13 to an intermediate frequency amplifier 14, the latter amplifier also having any desired number of stages. The output terminals of the intermediate frequency amplifier 14 are connected to a video amplifier 16 of one or more stages through a second detector designated generally as 15. The output terminals of video amplifier 16 are connected to the input electrodes of a cathode ray image reproducing device 17.

Second detector 15 is also coupled to an amplifier 18 which, in turn, is connected to a synchronizing signal separator 19 and to an automatic gain control (AGC)

circuit 20. Separator 19 is connected to a field sweep system 21 and to a line sweep system 22, and the sweep systems are connected respectively to the field deflection elements 23 and line deflection elements 24 of reproducing device 17. AGC circuit 20 is connected to the stages 10, 13 and 14 of the receiver to control the gain of these stages in accordance with well-known procedure.

The various stages of the receiver shown in block form are in themselves well-known and any suitable circuits may be used to constitute these stages. Since the invention is not concerned with the individual circuits in these stages, a detailed description thereof is deemed to be unnecessary.

Standard present-day television signals are constituted to include video frequency components and synchronizing components having an amplitude exceeding the maximum amplitude of the video components. The synchronizing components have a relatively low frequency, and the video components extend through a wide frequency range. When the receiver is tuned to utilize such a television signal intercepted by antenna 11, 12; the signal is amplified by radio frequency amplifier 10 and heterodyned to the selected intermediate frequency of the receiver in converter 13. The resulting intermediate frequency signal is amplified in intermediate frequency amplifier 14 and detected in second detector 15 to produce a composite video signal which includes the aforementioned synchronizing and video components. The composite video signal is amplified in video amplifier 16, and applied to the input electrodes of reproducing device 17 to control the intensity of the cathode-ray beam therein in accordance with the picture intelligence.

The composite video signal from second detector 15 is also supplied to amplifier 18 wherein it is amplified and the low frequency synchronizing components thereof are supplied to AGC circuit 20 and synchronizing signal separator 19. Separator 19 separates the synchronizing components from the composite video signal and supplies these components to sweep systems 21 and 22 to synchronize the field and line deflections of the cathode ray beam in device 17 with the incoming television signal. Amplifier 18 also supplies the composite video signal to AGC circuit 20 to enable the AGC circuit to develop a control potential which varies in accordance with variations in intensity of the received television signal, thereby to control the gain of the receiver and compensate for such variations. In this manner, reproducing device 17 reproduces the image intelligence represented by the received television signal. The sound portion of the television receiver forms no part of the present invention, and, for that reason, has not been shown.

Second detector 15 includes a rectifier device 25 having a cathode coupled to intermediate frequency amplifier 14, and having an anode coupled to an output circuit which includes a load resistor 26, peaking coil 27 and intermediate frequency by-passing capacitor 28. The capacitor 28 is connected between the anode at a point of reference potential, or ground, and elements 26 and 27 are series-connected across the capacitor. The common junction of the last-mentioned elements is connected to video amplifier 16 and is also connected to ground through a potentiometer including resistors 29 and 30, resistor 29 being shunted by a capacitor 31.

The common junction of resistors 29 and 30 is connected to the control electrode 32 of an electron discharge device 33 constituting amplifier 18. Discharge device 33 has a cathode 34 directly connected to ground and has an anode 35 which is connected through a load resistor 36 to the positive terminal B+ of a source of unidirectional potential. The negative terminal of this source is connected to ground. Anode 35 is connected to synchronizing signal separator 19 and to AGC circuit 20.

Figure 2A:
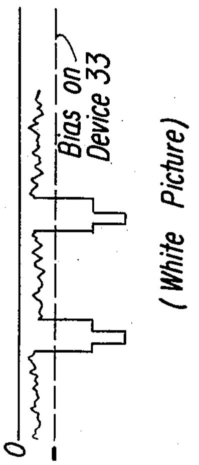
Figure 2B:
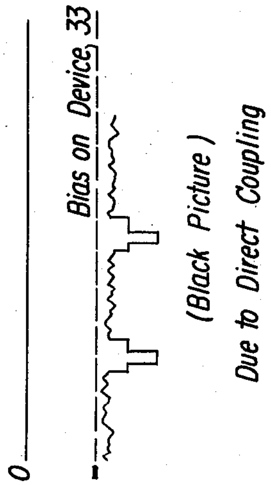

Rectifier 25 is connected so that the aforementioned composite video signal appears across load resistor 26 with negative polarity with respect to ground and with the synchronizing components thereof extending in a negative-going sense. The control electrode 32 is directly coupled to the output circuit of the second detector by potentiometer 29, 30 so that the low frequency synchronizing components may be adequately amplified by amplifier 18. Due to the direct coupling between the amplifier and the second detector, the bias on the amplifier device 33 is established at a value related to the average value of the composite video signal and has a tendency to vary in a negative direction as the picture content of the composite video signal varies from white to black. Potentiometer 29, 30 taps down the signal applied to control electrode 32 of device 33, and the circuit parameters are made such that, without further compensation, device 33 is insufficiently biased thereby to perform its amplifying function properly. The bias established in device 33 due to the direct coupling network is shown in Figures 2A and 2B. It can be seen from these figures that the bias on device 33 becomes increasingly negative as the picture content changes from white to black.

Figure 3A:
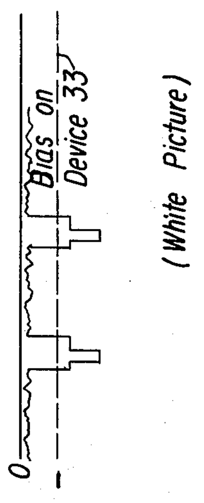
Figure 3B:
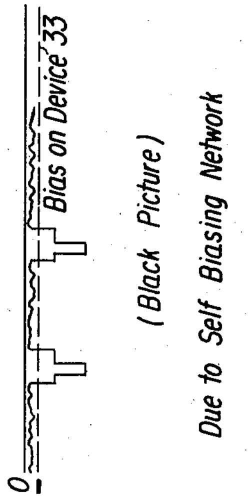

To provide the aforementioned further compensation, capacitor 31 is shunted across resistor 29 and constitutes therewith a self-biasing network for discharge device 33. This self-biasing network increases the negative bias on control electrode 32 and establishes a resultant bias on the control electrode that is appropriate for the proper functioning of the amplifier. Moreover, as is inherent in self-biasing networks, the latter bias tends to vary in a positive direction as the picture content of the composite video signal varies from white to black and compensates for the first-mentioned tendency. The bias on device 33, due to the self-biasing network, is shown in Figures 3A and 3B, and it can be seen that this bias becomes less negative as picture content changes from white to black.

Therefore, discharge device 33 is directly coupled to second detector 15 and is established at a certain bias having a tendency to vary in one direction as picture content changes from white to black, and the device is also self-biased to establish thereon a bias having a tendency to vary in the other direction as picture content changes from white to black. In this manner, a desired resultant bias is established on device 33 that is substantially independent of picture variations in the composite video signal.

In a constructed embodiment of the invention, the following circuit parameters were used:

| | | |
|---|---|---|
| Resistor **26** | ohms | 5600 |
| Resistor **29** | megohms | 1 |
| Resistor **30** | do | 1 |
| Capacitor **31** | microfarads | .1 |

It is to be understood, of course, that these values are given merely by way of example and are not intended to limit the invention in any way.

Therefore, by means of the simple network of the present invention, amplifier 18 operates efficiently to supply the synchronizing components of the composite video signal to the synchronizing signal separator 19 and to the AGC circuit 20, and its operation is unimpaired to any appreciable extent in the presence of variations in the picture content of the composite video signal translated thereby.

While a particular embodiment of the invention has been shown and described, modifications may be made and it is intended in the appended claims to cover all such modifications as fall within the true spirit and scope of the invention.

I claim:

1. A television receiver for utilizing a composite television signal including video components and synchronizing components having an amplitude exceeding that of the video components, said receiver including in combination, automatic gain control circuit means adapted to produce a gain control potential for the receiver which is variable according to the level of signals applied thereto, a detector for demodulating such television signal to develop a negative-going composite video signal including the aforesaid video and synchronizing components and having an average value varying in accordance with changes in picture content, an amplifier for the composite video signal, said amplifier including an electron discharge device with a control element and an output circuit coupled to said automatic gain control circuit means, circuit means for direct current coupling said control element to said detector to establish a certain bias thereon having a tendency to vary in response to variations in the picture content in the aforesaid composite video signal, said circuit means including parallel connected resistor means and capacitor means coupled between said detector and said control element and further resistor means coupled to said control element as a discharge path for said capacitor means, the values of said capacitor means and said further resistor means being selected to form a self-biasing network for said control element for establishing a bias having a tendency to vary in the opposite sense to the aforementioned tendency in response to such variations in the aforesaid picture content, so that the bias on said control element is substantially independent of changes in picture content in the aforesaid composite video signal.

2. A television receiver for utilizing a composite television signal including video components and synchronizing components having an amplitude exceeding that of the video components, said receiver including in combination, a detector for demodulating such television signal to develop a negative-going composite video signal including the aforesaid video and synchronizing components and having an average value varying in accordance with changes in picture content, an amplifier for the composite video signal including a discharge device having a control element, a potentiometer connected between said detector and a point of reference potential, a direct current connection extending from a point on said potentiometer to said control element to establish a certain bias thereon having a tendency to vary in response to variations in the picture content of the aforesaid composite video signal, and capacitor means coupled across a portion of said potentiometer to provide an alternating current path to said control element therethrough, the values of said capacitor means and said potentiometer being selected to form a self-biasing network in cooperation with said control element at the frequency of said composite video signal for establishing a bias on said control element having a tendency to vary in the opposite sense to the aforementioned tendency in response to such variation in the aforesaid picture content, so that the bias of said control element is rendered substantially independent of changes in picture content in the aforesaid composite video signal.

3. A television receiver for utilizing a composite televsion signal including video components and synchronizing components having amplitudes exceeding those of the video components, said receiver including in combination, automatic gain control circuit means providing a gain control potential for the receiver in response to application thereto of a signal, deflection circuit means for utilizing the synchronizing components of the television signal, a detector for demodulating the television signal, said detector being poled to develop a negative going composite video signal including the aforesaid video and synchronizing components, the negative going composite video signal having an average direct current value varying in accordance with average changes in the video components, an amplifier for the composite video signal including an electron discharge device having an anode and a cathode and a control electrode, circuit means coupling said anode to said automatic gain control circuit means and to said deflection circuit means to apply the composite video signal thereto, resistor means coupled to said detector and including a first portion coupled between said cathode and said control electrode and a second portion coupled between said detector and said control electrode for applying a portion of the negative going composite video signal to said electron discharge device whereby the bias thereof tends to vary in accordance with variations in said average direct current value, and capacitor means coupled across at least a portion of said second portion of said resistor means, the values of said capacitor means and said resistor means being selected to provide self-biasing of said control electrode by the composite video signal for producing a bias on said discharge device having a tendency to vary in the opposite sense to the aforementioned tendency in response to variations in the video components, whereby the resultant bias on said electron discharge device is substantially independent of changes in picture content represented by the video components.

4. A television receiver for utilizing a composite television signal including video components and synchronizing components having an amplitude exceeding that of the video components, said receiver including in combination, automatic gain control circuit means adapted to produce a gain control potential for the receiver which is variable according to the level of signals applied thereto; a detector including a rectifier device having a pair of electrodes for demodulating such television signal to develop a negative-going composite video signal including the aforesaid video and synchronizing components and having an average value varying in accordance with changes in picture content; an amplifier for the composite video signal including an electron discharge device having an anode, a cathode, and a control electrode; means coupling said anode to said automatic gain control circuit means; a direct current connection from said cathode to a point of reference potential; a pair of series-connected resistors of equal value connected between one of said electrodes of said rectifier device and said point of reference potential; a direct current connection extending from the common junction of said resistors to said control electrode for establishing a certain bias on said discharge device having a tendency to vary in response to variations in the picture content of the aforesaid composite video signal, and a capacitor connected across the one of said resistors connected to said one of said rectifier electrodes, the values of said capacitor and the other of said resistors being selected to constitute a self-biasing network for said discharge device for establishing a bias on said discharge device having a tendency to vary in the opposite sense to the aforementioned tendency in response to such variations in the aforesaid picture content, so that the resultant bias on said discharge device is rendered substantially independent of changes in picture content in the aforesaid composite video signal.

5. A television receiver for utilizing a composite television signal including video components and synchronizing components having an amplitude exceeding that of the video components, said receiver including in combination, first circuit means adapted to develop an automatic gain control potential, second circuit means adapted to develop beam deflection signals, a detector including a rectifier device having a pair of electrodes; an output circuit coupled to one of said electrodes for deriving a composite video signal of negative polarity with respect to a reference potential and having the aforesaid synchronizing components extending in a negative-going direction, and further having an average value varying in accordance with changes in picture content from black to white representations; an amplifier for the composite video signal including an electron discharge device having an anode, a cathode, and a control electrode; means coupling said anode to said first and second circuit means;

a direct current connection from said cathode to a point of the aforesaid reference potential; a pair of series-connected resistors connected between said detector output circuit and said point of reference potential; a direct current connection extending from the common junction of said resistors to said control electrode for applying a certain bias to said control electrode having a tendency to become more negative as the amplitude of said video components increases towards that of said synchronizing components; and a capacitor connected across the one of said resistors connected to said detector output circuit to constitue with the other of said resistors a self-biasing network for said discharge device for establishing bias on said discharge device having a tendency to become less negative in response to increases in the amplitude of said video components towards that of said synchronizing components, so that the resultant bias on said discharge device is rendered substantially independent of changes in picture content in the aforesaid video components.

References Cited in the file of this patent

UNITED STATES PATENTS

| | | |
|---|---|---|
| 2,356,141 | Applegarth | Aug. 22, 1944 |
| 2,606,247 | Fyler | Aug. 5, 1952 |

OTHER REFERENCES

Rider's Television Manual, vol. 10, CBS, page 10–5.

Rider's Television Manual, vol. 10, Capehart-Farnsworth TV page 10–10. Copyrighted November 21, 1952. (Copy in Scientific Library.)

Rider's Television Manual, vol. 9; Emerson TV page 9–8. Copyrighted April 29, 1952. (Copy in Scientific Library.)